United States Patent
Wong et al.

(10) Patent No.: US 10,242,088 B2
(45) Date of Patent: Mar. 26, 2019

(54) MULTI-SOURCE SEARCH

(71) Applicant: Microsoft Corporation, Redmond, WA (US)

(72) Inventors: Sandy Wong, Seattle, WA (US); Erik Theodore Bergman, Seattle, WA (US); Yu-Ting Kuo, Sammamish, WA (US); Evan Ming Lew, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 614 days.

(21) Appl. No.: 14/489,689

(22) Filed: Sep. 18, 2014

(65) Prior Publication Data
US 2016/0085753 A1    Mar. 24, 2016

(51) Int. Cl.
*G06F 17/30* (2006.01)
(52) U.S. Cl.
CPC .... *G06F 17/3064* (2013.01); *G06F 17/30864* (2013.01)
(58) Field of Classification Search
CPC .......... G06F 17/3053; G06F 17/30864; G06F 17/30867; G06F 17/30973
USPC ................. 707/722, 734, 740, 767
See application file for complete search history.

(56) References Cited

U.S. PATENT DOCUMENTS

| | | | |
|---|---|---|---|
| 7,774,345 B2 | 8/2010 | MacLaurin et al. | |
| 7,895,175 B2 | 2/2011 | Kumar | |
| 8,386,469 B2 * | 2/2013 | Reuther | G06F 17/30427 707/713 |
| 8,478,751 B1 * | 7/2013 | Garg | G06F 17/30864 707/723 |
| 8,965,871 B2 * | 2/2015 | Kelley | G06Q 30/02 705/14.4 |
| 8,965,872 B2 * | 2/2015 | Hsu | G06F 17/3064 707/706 |
| 9,317,585 B2 * | 4/2016 | Heymans | G06F 17/30867 |

(Continued)

OTHER PUBLICATIONS

"A New App that helps you Search all Your Personal Online Content in One Place!", Retrieved Date: May 13, 2014, pp. 4, Available at: http://apps.opera.com/en_in/product-review.php?id=188.

(Continued)

*Primary Examiner* — Jean M Corrielus
(74) *Attorney, Agent, or Firm* — Shook, Hardy & Bacon L.L.P.

(57) ABSTRACT

One or more techniques and/or systems are provided for query suggestion formulation for multi-source queries, for ranking multi-source search results, and/or for exposing contextual launch functionality through multi-source search results of a multi-source search interface. In an example, a query suggestion may be provided for a partial search query based upon an implied content source that corresponds to a search intent of a user (e.g., an intent to view videos, as opposed to images, of houses). In another example, relevancy ranks may be assigned to content sources based upon a content type preference of a user, and search results may be provided from content sources having relevancy rankings above a relevancy threshold. In another example, links to applications and/or execution contexts may be embedded within search results so that applications may be launched into contextually aware states from the search results.

20 Claims, 8 Drawing Sheets

(56) References Cited

U.S. PATENT DOCUMENTS

| | | | |
|---|---|---|---|
| 2005/0149496 A1 | 7/2005 | Mukherjee et al. | |
| 2007/0192300 A1* | 8/2007 | Reuther | G06F 17/30427 |
| 2010/0070448 A1* | 3/2010 | Omoigui | H01L 27/1463 |
| | | | 706/47 |
| 2012/0173505 A1* | 7/2012 | Diab | G06F 17/30864 |
| | | | 707/706 |
| 2012/0179706 A1 | 7/2012 | Hobbs et al. | |
| 2012/0191716 A1* | 7/2012 | Omoigui | H01L 27/1463 |
| | | | 707/740 |
| 2012/0265779 A1* | 10/2012 | Hsu | G06F 17/3064 |
| | | | 707/767 |
| 2012/0265784 A1* | 10/2012 | Hsu | G06F 17/3064 |
| | | | 707/771 |
| 2013/0117297 A1 | 5/2013 | Liu et al. | |
| 2013/0166543 A1* | 6/2013 | MacDonald | G06F 17/3002 |
| | | | 707/723 |
| 2013/0226935 A1 | 8/2013 | Bai et al. | |
| 2013/0246414 A1* | 9/2013 | Nair | G06F 17/30867 |
| | | | 707/732 |
| 2013/0282685 A1* | 10/2013 | Steelberg | G06Q 30/02 |
| | | | 707/706 |
| 2013/0282702 A1 | 10/2013 | Zhu et al. | |
| 2014/0195506 A1* | 7/2014 | Perlegos | G06F 17/3064 |
| | | | 707/706 |
| 2014/0280107 A1* | 9/2014 | Heymans | G06F 17/3064 |
| | | | 707/727 |
| 2014/0358909 A1* | 12/2014 | Kolba, Jr. | G06F 17/3053 |
| | | | 707/723 |
| 2014/0358970 A1* | 12/2014 | Morris | G06F 17/30392 |
| | | | 707/772 |
| 2017/0039248 A1* | 2/2017 | Morris | G06F 17/30392 |

OTHER PUBLICATIONS

"Oracle Secure Enterprise Search 11g", Published on: Apr. 16, 2011, pp. 12 Available at: http://www.oracle.com/technetwork/search/oses/overview/ses-datasheet-11-129111.pdf.

Hong, et al., "Mixture Model with Multiple Centralized Retrieval Algorithms for Result Merging in Federated Search", In Proceedings of the 35th International ACM SIGIR Conference on Research and Development in Information Retrieval, Aug. 12, pp. 821-830, http://dl.acm.org/citation.cfm?id=2348283.2348393&coll=DL&dl=ACM&CFID=458795484&CFTOKEN=78486013.

"Everdesk", Published on: Jun. 11, 2012, pp. 2 Available at: http://www.everdesk.com/product.

"Search, Share, Print, and More", Published on: Oct. 21, 2013, pp. 11 Available at: http://windows.microsoft.com/en-in/windows-8/charms-tutorial.

"International Search Report & Written Opinion Received for PCT Application No. PCT/US2015/050538", dated Nov. 13, 2015, 10 Pages.

Brin, et al., "The Anatomy of a Large-Scale Hypertextual Web Search Engine", Proceedings of the Seventh International World-Wide Web Conference, Apr. 14, 1998, 20 Pages.

Boleyn, et al., "Web Crawler", Retrieved at<<https://en.wikipedia.org/w/index.php?title=Web_crawler&oldid=623733669>> Sep. 1, 2014, 14 Pages.

"Extended Search Report Issued in European Patent Application No. 17198301.8", dated Jan. 5, 2018, 10 Pages.

* cited by examiner

MULTI-SOURCE SEARCH

BACKGROUND

Many users may discover content using search functionality. In an example, a user may locate files, such as images, documents, and/or other local files, using a file system search interface. In another example, the user may locate social network user profiles using a social network search interface. In another example, the user may locate emails, contacts, and/or appointments using an email search interface.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for query suggestion formulation for multi-source queries, for ranking multi-source search results, and/or for exposing contextual launch functionality through multi-source search results of a multi-source search interface are provided herein. In an example of query suggestion formulation for multi-source queries, a partial search query, input into a multi-source search interface by a user, may be identified. User signals associated with the user may be evaluated to identify a search intent of the user. An implied content source may be identified from a set of available content sources based upon the search intent. A query suggestion may be formulated based upon the implied content source and the partial search query. The query suggestion may be provided through the multi-source search interface.

In an example of ranking multi-source search results, a search query, input into a multi-source search interface by a user, may be received. A first content source, providing a first type of content associated with the search query, may be identified. A second content source, providing a second type of content associated with the search query, may be identified. User signals, associated with the user, may be evaluated to identify a content type preference of the user. A first relevancy rank may be assigned to the first content source based upon the content type preference. A second relevancy rank may be assigned to the second content source based upon the content type preference. Responsive to the first relevancy rank exceeding a relevancy threshold, first content, corresponding to the search query, may be provided from the first content source through the multi-source search interface as a first search result. Responsive to the second relevancy rank exceeding the relevancy threshold, second content, corresponding to the search query, may be provided from the second content source through the multi-source search interface as a second search result.

In an example of exposing contextual launch functionality through multi-source search results of a multi-source search interface, a search query, input into a multi-source search interface by a user, may be received. A first content source, providing a first type of content associated with the search query, may be identified. A first application, associated with the first type of content, may be identified. A second content source, providing a second type of content associated with the search query, may be identified. A second application, associated with the second type of content, may be identified. A first link, to the first application, may be embedded within a first search result corresponding to the search query. A second link, to the second application, may be embedded within a second search result corresponding to the search query. The first search result and the second search result may be provided through the multi-source search interface.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
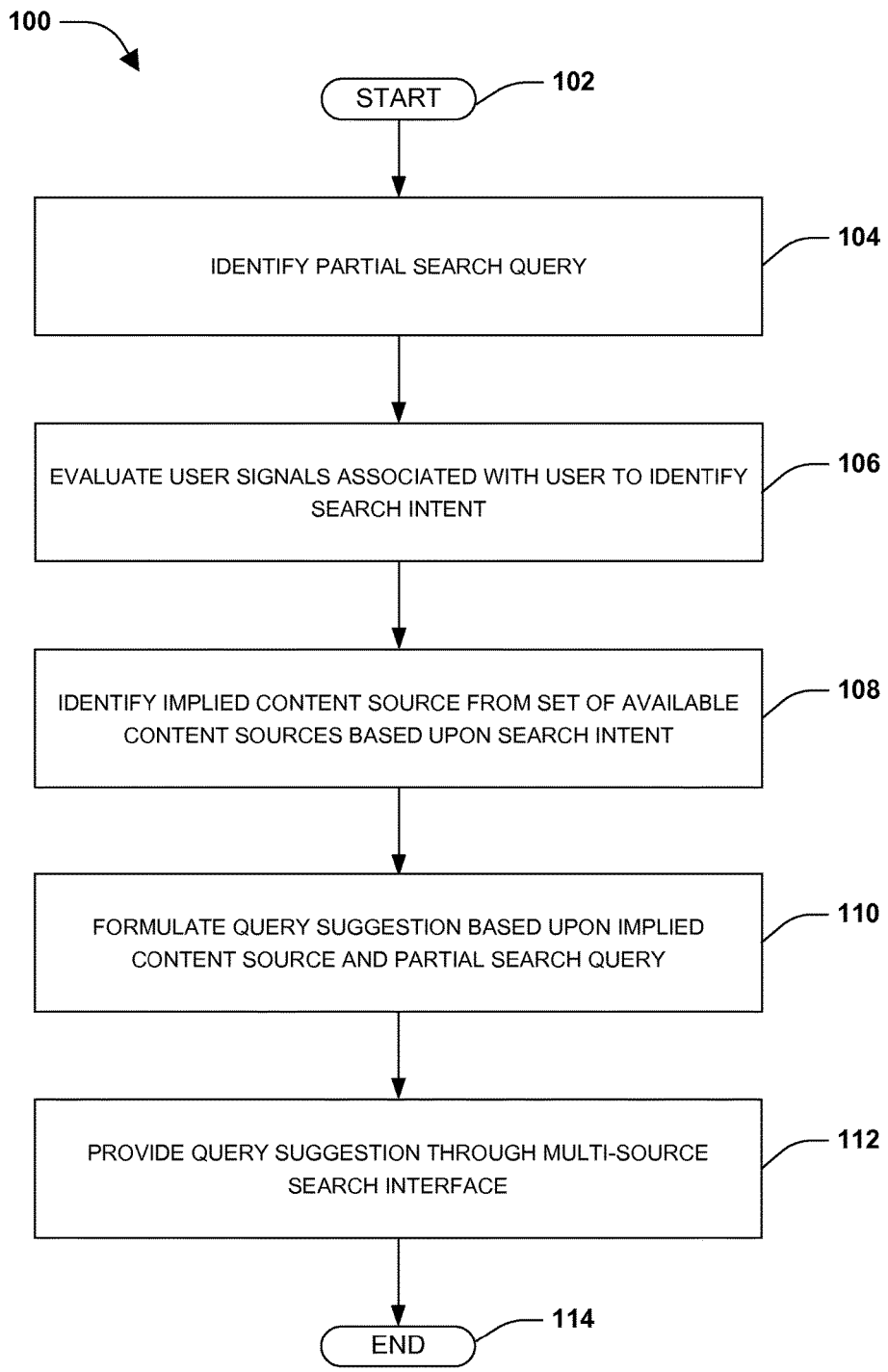
FIG. 1 is a flow diagram illustrating an exemplary method of query suggestion formulation for multi-source queries.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for query suggestion formulation for multi-source queries, for ranking multi-source search results, and/or for exposing contextual launch functionality through multi-source search results of a multi-source search interface are provided herein. Users may desire to search for content that may be available from various sources (e.g., images from a photo sharing service, images from websites, emails from a corporate email service, emails from a personal email service, movies from a video streaming service, etc.). Accordingly, a multi-source search interface is provided herein, along with various features for the multi-source search interface such as query suggestion formulation, content and content source ranking, and/or contextual launch functionality. The multi-source search interface may search multiple content sources in an efficient manner (e.g., content sources that provide content and/or types of content that may be of interest to the user and/or relevant to a user search intent). In an example, a multi-source search interface component may be locally hosted on a client device, and thus may mitigate bandwidth utilization and/or preserve privacy of user information, such as user signals used to identify a search intent of a user and/or a content type preference of the user. In another example, the multi-source search interface component may be hosted on a remote server, and thus may mitigate client side memory and/or processor utilization. In an example, at least some of a multi-source search interface component may be hosted locally and at least some of the multi-source search interface component may be hosted remotely.

An embodiment of query suggestion formulation for multi-source queries is illustrated by an exemplary method 100 of FIG. 1. At 102, the method starts. At 104, a partial search query, input into a multi-source search interface by a user, may be identified. For example, the user may begin inputting "lawn ca" into the multi-source search interface (e.g., a search charm hosted by an operating system). At 106, given user consent, user signals, associated with the user, may be evaluated to identify a search intent of the user. For example, a file (e.g., a lawn care coupon for a lawn care company), social network interaction (e.g., a recent befriending of the lawn care company), message communication (e.g., a lawn care promotional email received from the lawn care company), web browsing history, an image, a geolocation, a time (e.g., a current date that is just before the expiration of the lawn care coupon), an executing application (e.g., a phone application), an installed application, an app store application, calendar data, email data, social network data, a device form factor, a user search log, and/or content consumed by the user may be evaluated to determine that the user has a search intent to access the lawn care coupon, access the lawn care promotional email, and/or access a lawn care phone contact for the lawn care company (e.g., but not to visit a social network profile of the lawn care company and/or a website of the lawn care company based upon social network data and/or web browsing history indicating that the user rarely uses social networks and/or rarely browses websites on a mobile device with which the user is currently engaged). The user may take affirmative action, such as providing opt-in consent, to allow access to and/or use of the user signals, such as for the purpose of search intent identification (e.g., where a user responds to a prompt regarding the collection and/or use of such information).

At 108, an implied content source may be identified from a set of available content sources based upon the search intent. For example, the set of available content sources may comprise a video streaming content source, a messaging content source, a file system content source, a social network content source, a website content source, a document content source, an image content source, and/or any other type of data or service content source. For example, a file system content source that has access to the lawn care coupon, an email content source that has access to the lawn care promotional email, and/or a phone contacts content source that has access to the lawn care phone contact may be identified as the implied content source.

In another example of identifying an implied content source, a messaging server content source may be identified as the implied content source based upon prior message communications between the user and a second user corresponding to a partial search query (e.g., a partial search query of "Mark from the law"). In another example of identifying an implied content source, a social network content source may be identified as the implied content source based upon prior social network interactions between the user and a second user corresponding to a partial search query (e.g., a partial search query of "Mark from the law"). In another example of identifying an implied content source, a file system content source may be identified as the implied content source based upon a second user, corresponding to a partial search query (e.g., a partial search query of "Mark from the law"), being an author or a provider of a file (e.g., Mark from the lawn care company may have created and/or provided the lawn care coupon to the user).

At 110, a query suggestion may be formulated based upon the implied content source and/or the partial search query. The query suggestion may comprise a suggested query completion, a website, a user contact, a file, content having a content type provided by the content source, etc. For example, the query suggestion may comprise a suggestion for the lawn care coupon, the lawn care promotional email, and/or the lawn care phone contact. At 112, the query suggestion may be provided through the multi-source search interface. In this way, query suggestions, for content provided by various content sources, may be provided to the user. At 114, the method ends.

Figure 2:
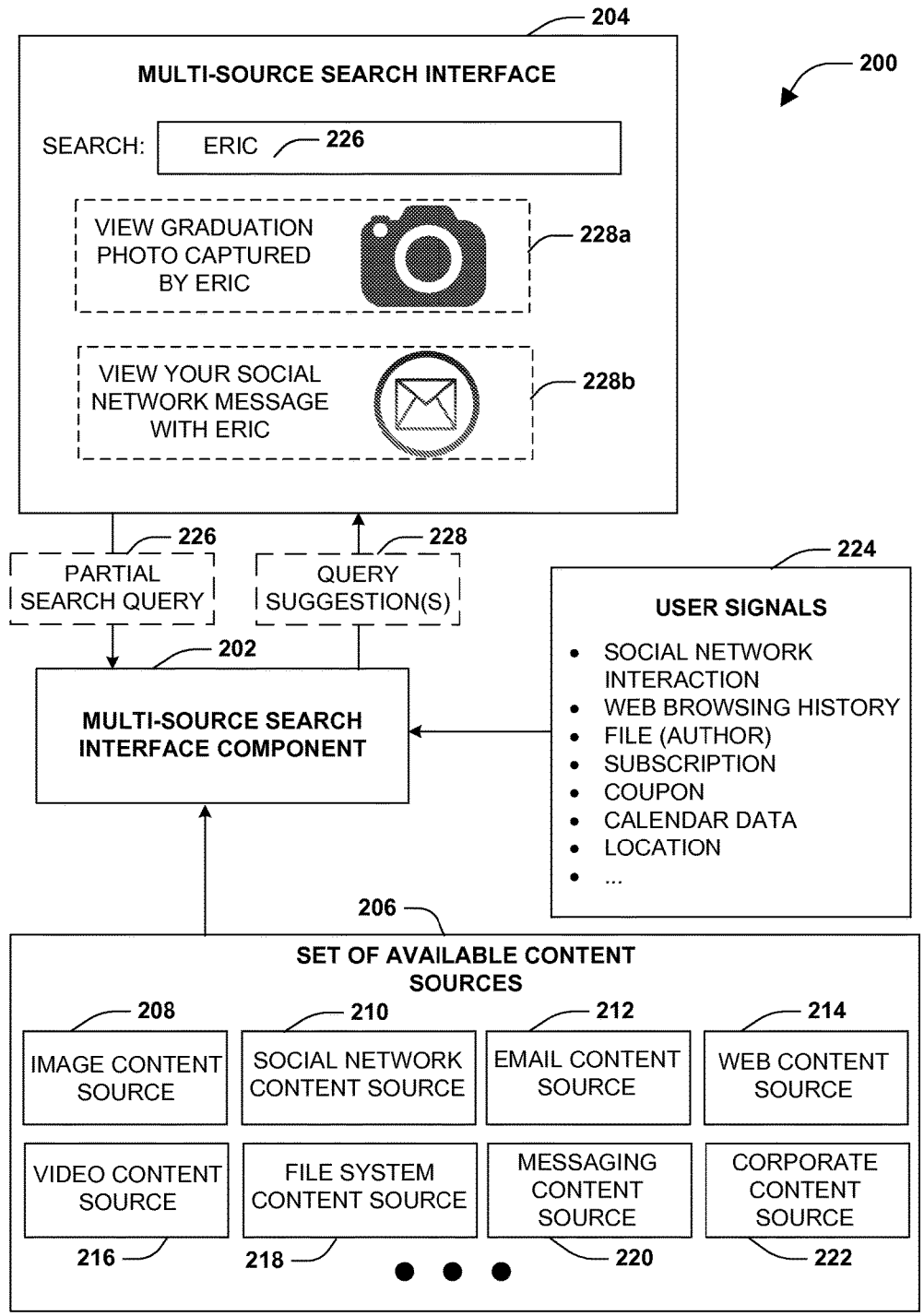
FIG. 2 is a component block diagram illustrating an exemplary system for query suggestion formulation for multi-source queries.

FIG. 2 illustrates an example of a system 200 for query suggestion formation for multi-source queries. The system 200 comprises a multi-source search interface component 202. In an example, the multi-source search interface component 202 is hosted on a client device through which a multi-source search interface 204 is provided to a user. In another example, the multi-source search interface component 202 is hosted on a remote server, and may be configured to provide query suggestions and/or search results to the client device for display through the multi-source search interface 204. The multi-source search interface component 202 may be configured to identify a partial search query 226 (e.g., "Eric") input into the multi-source search interface 204 by the user. The multi-source search interface component 202 may be configured to evaluate user signals 224, such as social network interaction, web browsing history, files, subscriptions, coupons, calendar data, a location of the user, etc., to identify a search intent of the user. For example, the search intent may correspond to a locate graduation photo search intent (e.g., view a graduation photo captured/authored by Eric, and provided to the user by Eric) and/or a view social network profile message search intent (e.g., view social network messages exchanged between the user and Eric).

The multi-source search interface component 202 may be configured to identify an implied content source from a set of available content sources 206 based upon the search intent. The set of available content sources 206 may comprise an image content source 208, a social network content source 210, an email content source 212, a web content source 214, a video content source 216, a file system content source 218, a messaging content source 220, a corporate content source 222 (e.g., a file sharing service, a corporate email service, etc.), etc. In an example, the image content source 208 and the social network content source 210 may be identified as implied content sources. One or more query suggestions 228 may be formulated based upon the implied content source and/or the partial search query. For example, a first query suggestion 228a may suggest the graduation photo, captured by Eric, that may be accessible from the image content source 208 (e.g., a cloud image sharing service from which the graduation photo may be obtained)

and a second query suggestion 228*b* may suggest social network profile messages between the user and Eric, which may be accessible from the social network content source 210. In an example, the first query suggestion 228*a* may comprise an icon for the cloud image sharing service, a mini-screenshot of the graduation photo captured by Eric and/or a text description, etc., where any one or more of which may be clicked on and/or otherwise activated to access the graduation photo from the cloud image sharing service. In an example, the second query suggestion 228*b* may comprise an icon for the social network content source, a mini-screenshot of one or more of the social network messages and/or a text description, etc., where any one or more of which may be clicked on and/or otherwise activated to access the social network profile messages. In this way, query suggestions may be provided for the multi-source search interface 204.

Figure 3:
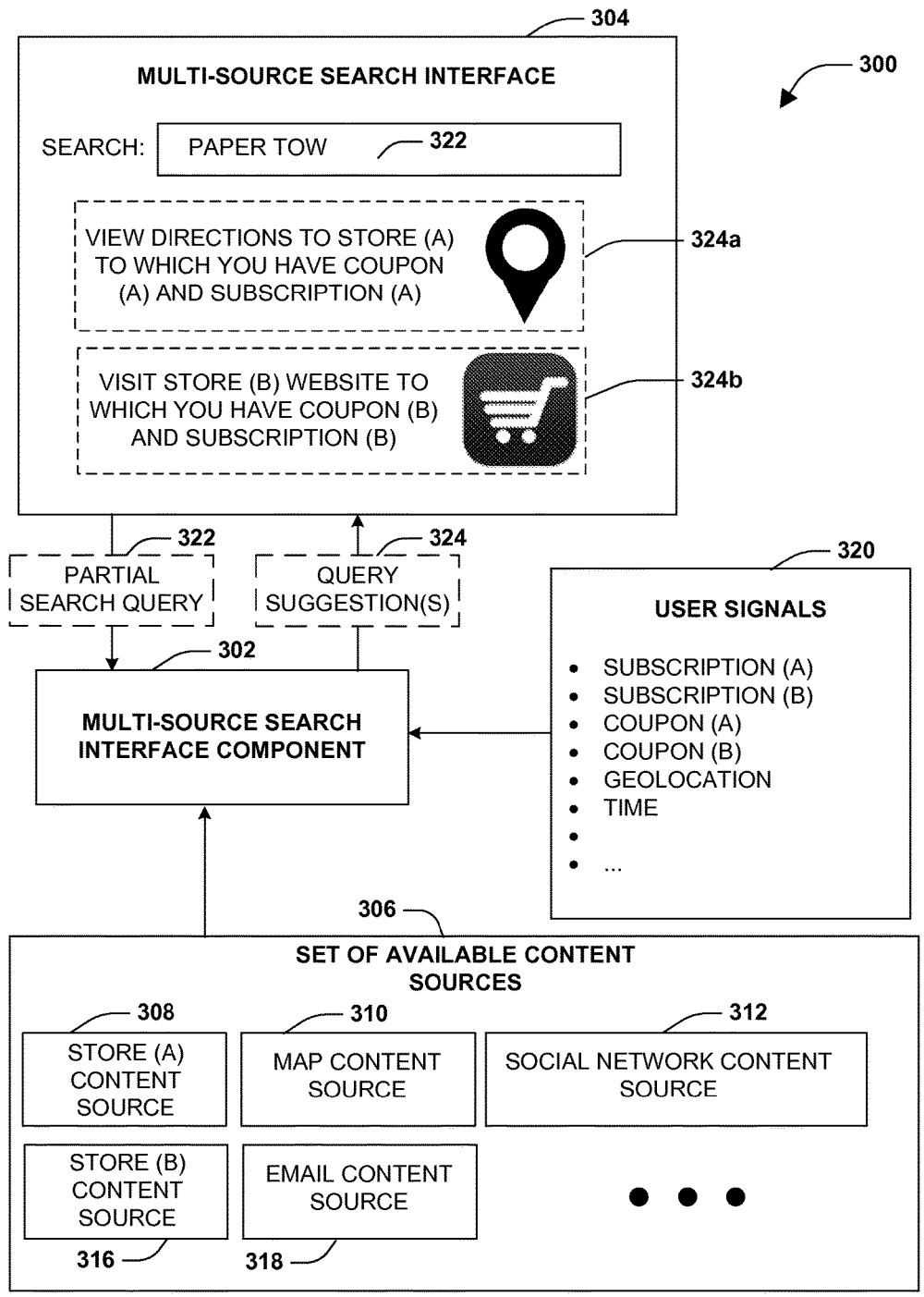
FIG. 3 is a component block diagram illustrating an exemplary system for query suggestion formulation for multi-source queries.

FIG. 3 illustrates an example of a system 300 for query suggestion formation for multi-source queries. The system 300 comprises a multi-source search interface component 302 associated with a multi-source search interface 304 provided to a user. The multi-source search interface component 302 may be configured to identify a partial search query 322 (e.g., "paper tow") input into the multi-source search interface 304 by the user. The multi-source search interface component 302 may be configured to evaluate user signals 320, such as a subscription (A) to a store (A), a subscription (B) to a store (B), a coupon (A) to the store (A), a coupon (B) to the store (B), a geolocation of the user, a current time, etc., to identify a search intent of the user. For example, the search intent may correspond to a store (A) directions search intent (e.g., so that the user may utilize the coupon (A) and the subscription (A) to purchase paper towels from the store (A) that is currently open for business for 2 more hours) and/or a store (B) website search intent (e.g., so that the user may utilize the coupon (B) and the subscription (B) to order paper towels online from the store (B) that is currently closed for the day).

The multi-source search interface component 302 may be configured to identify an implied content source from a set of available content sources 306 based upon the search intent. The set of available content sources 306 may comprise a store (A) content source 308 (e.g., a virtual storefront, such as a shopping webpage, for the store (A)), a map content source 310, a social network content source 312, a store (B) content source 316 (e.g., a virtual storefront, such as a shopping webpage, for the store (B)), an email content source 318, etc. In an example, the map content source 310 and the store (B) content source 316 may be identified as implied content sources. One or more query suggestions 324 may be formulated based upon the implied content source and/or the partial search query. For example, a first query suggestion 324*a* may suggest driving directions, provided by the map content source 310, to the store (A), and a second query suggestion 324*b* may suggest a store (B) shopping website accessible from the store (B) content source 316. In an example, the first query suggestion 324*a* may comprise an icon for the map content source, a mini-screenshot of the driving directions (e.g., on a map) and/or a text description, etc., where any one or more of which may be clicked on and/or otherwise activated to access the driving directions. In an example, the second query suggestion 324*b* may comprise an icon for the store (B) content source, a mini-screenshot of the store (B) shopping website and/or a text description, etc., where any one or more of which may be clicked on and/or otherwise activated to access the store (B) shopping website. In this way, query suggestions may be provided for the multi-source search interface 304.

Figure 4:
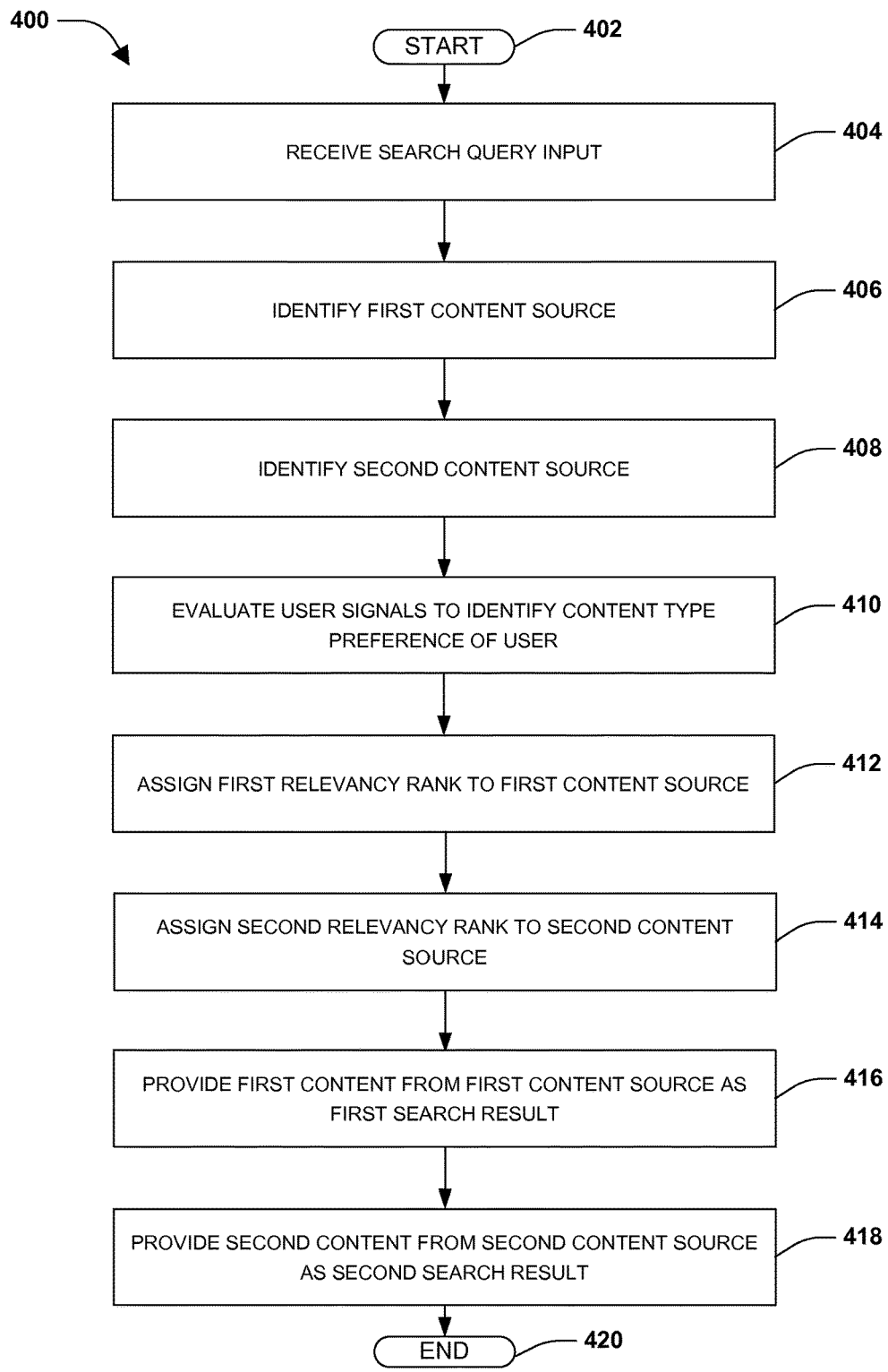
FIG. 4 is a flow diagram illustrating an exemplary method of ranking multi-source search results.

An embodiment of ranking multi-source search results is illustrated by an exemplary method 400 of FIG. 4. At 402, the method starts. At 404, a search query, input into a multi-source search interface by a user, may be received. For example, the user may submit a search query "trees". At 406, a first content source, providing a first type of content associated with the search query, may be identified (e.g., a photo sharing service that provides tree photos). At 408, a second content source, providing a second type of content associated with the search query, may be identified (e.g., a book store application through which the user may purchase tree painting instruction books). Other content sources may be identified (e.g., a lawn care company website providing lawn care advice).

At 410, given user consent, user signals, associated with the user, may be evaluated to identify a content type preference of the user. For example, a file (e.g., images of tree drawings created by the user), social network interaction (e.g., the user may befriend a drawing company social network user), message communication, web browsing history, a geolocation (e.g., a book store), a time, an executing application, an installed application, an app store application, calendar data, email data (e.g., the user may complain about the costs of lawn care companies), social network data, device form factor, a user search log, and/or any other content consumed by and/or relevant to the user may be evaluated to determine that the user has a content type preference for tree photos (e.g., image content) and tree painting books (e.g., shopping content such as books), and a disinterest in lawn care companies. The user may take affirmative action, such as providing opt-in consent, to allow access to and/or use of the user signals, such as for the purpose of content type preference identification (e.g., where a user responds to a prompt regarding the collection and/or use of such information).

In an example, relevancy ranks may be assigned to content sources client-side (e.g., to preserve privacy of user signals), server-side, or a combination of client-side and server-side. At 412, a first relevancy rank may be assigned to the first content source based upon the content type preference (e.g., a rank of 89/100 may be assigned to the photo sharing service because the photo sharing service provides tree photos that may be interesting to the user based upon the user having tree drawing files on a client device). At 414, a second relevancy rank may be assigned to the second content source based upon the content type preference (e.g., a rank of 85/100 may be assigned to the book store application because the book store application may sell tree painting instruction books that may be interesting to the user based upon the user being in a book store, having created tree drawing images, and befriending the drawing company social network user). Relevancy ranks may be assigned to other content sources, such as a third relevancy rank assigned to the third content source (e.g., a rank of 5/100 may be assigned to the lawn care company website because the user expressed a disinterest in lawn care companies).

At 416, responsive to the first relevancy rank exceeding a relevancy threshold (e.g., the rank of 89 may exceed a relevancy threshold of 70), first content, corresponding to the search query, may be provided from the first content source through the multi-source search interface as a first search result (e.g., one or more tree photos may be provided from the photo sharing service). At 418, responsive to the second relevancy rank exceeding the relevancy threshold (e.g., the rank of 85 may exceed the relevancy threshold of 70), second content, corresponding to the search query, may be provided from the second content source through the multi-source search interface as a second search result (e.g., one or more tree painting instruction books for sale by the book store application). If a relevancy rank of a content source does not exceed the relevancy threshold, then content from the content source may not be provided. For example, a lawn care webpage of the lawn care company website may not be provided as a search result because the rank of 5 does not exceed the relevancy threshold of 70.

In an example, the first search result may be displayed more prominently within a search result interface than the second search result (e.g., the first search result may be ordered or displayed before the second search result) based upon the first relevancy rank being greater than the second relevancy rank. In an example, a first link to a first application (e.g., a link to open the photo sharing service) associated with the first content may be embedded within the first search result. In another example, a second link to a second application (e.g., a link to open the book store application) associated with the second content may be embedded within the second search result. In an example, a first execution context may be embedded into the first link for launching the first application into a first contextually aware state (e.g., information used to launch the photo sharing service to display tree photos). In another example, a second execution context may be embedded into the second link for launching the second application into a second contextually aware state (e.g., information used to launch the book store application to display tree painting instruction books that are for sale). At 420, the method ends.

Figure 5:
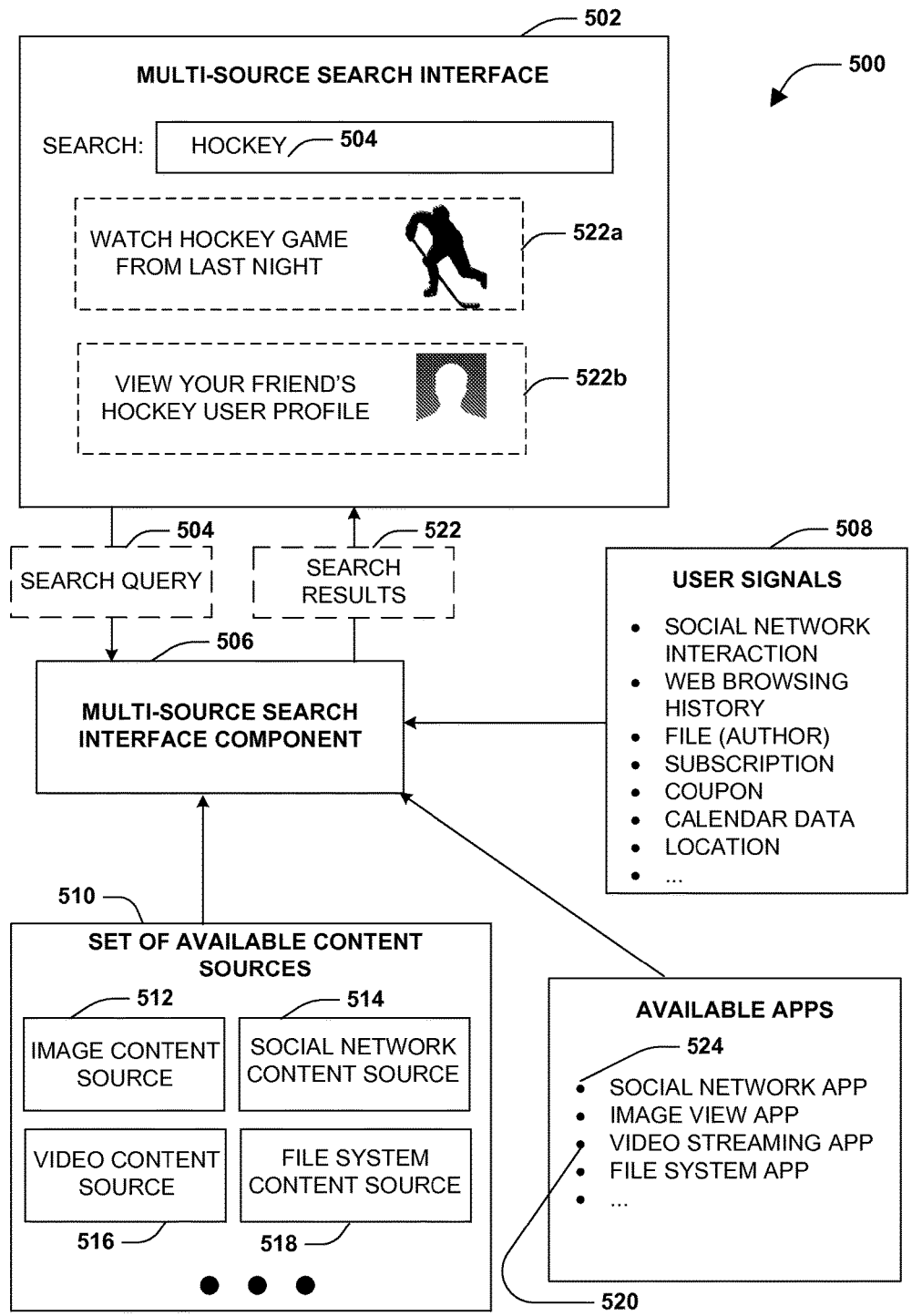
FIG. 5 is a component block diagram illustrating an exemplary system for ranking multi-source search results.

FIG. 5 illustrates an example of a system 500 for ranking multi-source search results. The system 500 comprises a multi-source search interface component 506. The multi-source search interface component 506 may be configured to receive a search query 504 input into a multi-source search interface 502 by a user. For example, the user may submit a search query 504 "hockey". The multi-source search interface component 506 may be configured to identify one or more content sources from a set of available content sources 510, comprising an image content source 512, a social network content source 514, a video content source 516, a file system content source, 518, and/or other content sources, based upon the search query 504. The multi-source search interface component 506 may identify a first content source that provides a first type of content associated with the search query (e.g., the video content source 516 comprising a hockey game video from last night's hockey game). The multi-source search interface component 506 may identify a second content source that provides a second type of content associated with the search query (e.g., the social network content source 514 comprising friends of the user having interests in hockey).

The multi-source search interface component 506 may be configured to evaluate user signals 508, associated with the user, to identify a content type preference of the user. For example, web browsing history (e.g., researching last night's hockey game), local files (e.g., hockey tickets), a subscription (e.g., a subscription to a hockey channel), calendar data (e.g., indicating that the user wants to review last night's hockey game highlights), and/or other user signals may indicate that the user has a relatively strong interest in hockey videos. The user signals 508 may indicate that the user has a relatively mild interest in hockey social network information (e.g., the user may have various social network friends with interests in hockey, but may rarely check such hockey social network profiles of a social network). The multi-source search interface component 506 may assign a first relevancy rank to the video content source 516 based upon the content type preference (e.g., a rank of 95/100 may be assigned to the video content source 516 because of the relatively strong interest in hockey videos). The multi-source search interface component 506 may assign a second relevancy rank to the social network content source 514 based upon the content type preference (e.g., a rank of 72/100 may be assigned to the social network content source 514 because of the relatively mild interest in the hockey related social network information).

The multi-source search interface component 506 may provide search results 522 for the search query 504 based upon the relevancy ranks assigned to the content sources. For example, a first search result 522a, comprising content from the video content source 516 (e.g., a hockey game video from last night's hockey game), may be displayed based upon the first relevancy ranking exceeding a relevancy threshold (e.g., the rank of 95 may exceed a relevancy threshold of 70). A second search result 522b, comprising content from the social network content source 514 (e.g., a friend's hockey user profile), may be displayed based upon the second relevancy ranking exceeding the relevancy threshold (e.g., the rank of 72 may exceed the relevancy threshold of 70). In an example, the first search result 522a may be displayed more prominently (e.g., ordered before, bolded, highlighted, colored differently, etc.) than the second search result 522b based upon the first relevancy ranking being greater than the second relevancy ranking. In an example, a video streaming app link to a video streaming app 520 may be embedded into the first search result 522a so that the video streaming app 520 may be launched into a contextually aware state (e.g., launched into playing the hockey game from last night based upon a first execution context embedded into the video streaming app link). In an example, the first search result 522a may comprise an icon for the video streaming app, a mini-screenshot of the hockey game and/or a text description (e.g., Team A vs. Team B, January 22), etc., where any one or more of which may be clicked on and/or otherwise activated to launch the video streaming app. (e.g., in the contextually aware state). In another example, a social network app link to a social network app 524 may be embedded into the second search result 522b so that the social network app 524 may be launched into a contextually aware state (e.g., launched into the friend's hockey user profile based upon a second execution context embedded into the social network app link). In an example, the second search result 522b may comprise an icon for the social network app, a mini-screenshot of the friend's hockey user profile and/or a text description, etc., where any one or more of which may be clicked on and/or otherwise activated to launch the social network app. (e.g., in the contextually aware state).

Figure 6:
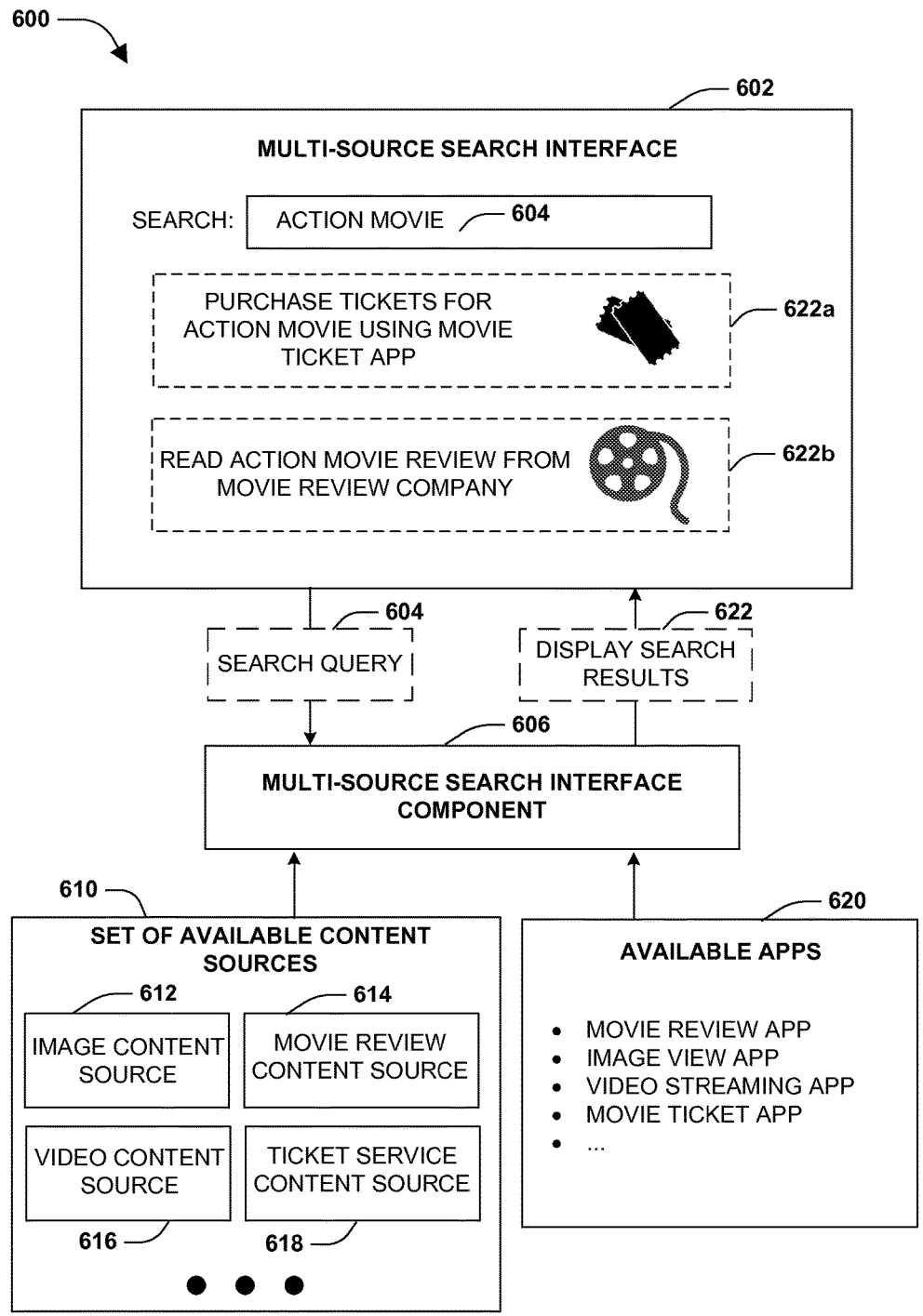
FIG. 6 is a component block diagram illustrating an exemplary system for exposing contextual launch functionality through multi-source search results of a multi-source search interface.

FIG. 6 illustrates an example of a system 600 for exposing contextual launch functionality through multi-source search results of a multi-source search interface 602. The system 600 comprises a multi-source search interface component 606. The multi-source search interface component 606 may be configured to receive a search query 604 input into the multi-source search interface 602 by a user (e.g., a search for "Action Movie"). The multi-source search interface component 606 may identify a first content source that provides a first type of content associated with the search query 604 (e.g., a ticket service content source 618 that allows users to purchase movie tickets to the Action Movie). The multi-source search interface component 606 may identify a second content source that provides a second type of content associated with the search query 604 (e.g., a movie review content source 614 (e.g., a Movie Review Company) that has an Action Movie review for the Action Movie (e.g., as may be presented thorough a social network profile of the Movie Review Company)). In an example, the content sources may be selected from a set of available content sources 610 comprising an image content source 612, a video content source 616, the movie review content source 614, the ticket service content source 618, and/or other content sources.

The multi-source search interface component 606 may identify a first application associated with the first type of content (e.g., a movie ticket app through which the user may access the ticket service content source 618 to purchase movie tickets to the Action Movie). The multi-source search interface component 606 may identify a second application associated with the second type of content (e.g., a movie review app that may provide access to the movie review content source 614 to read the Action Movie review from the Movie Review Company).

The multi-source search interface component 606 may embed a first link, to the first application, within a first search result 622a corresponding to the search query 604 (e.g., a movie ticket app link to the movie ticket app may be embedded into the first search result 622a). The multi-source search interface component 606 may embed a second link, to the second application, within a second search result 622b corresponding to the search query 604 (e.g., a movie review app link to the movie review app may be embedded into the second search result 622b). In an example, a first execution context may be embedded into the first link for launching the first application into a first contextually aware state (e.g., information used to launch the movie ticket app into a ticket ordering form for the Action Movie). In another example, a second execution context may be embedded into the second link for launching the second application into a second contextually aware state (e.g., information used to launch the movie review app to display the Action Movie review from the Movie Review Company). In an example, the first search result 622a may comprise an icon for the movie ticket app, a mini-screenshot for the Action Movie and/or a text description (e.g., ticket purchase price, a location of a nearest theatre, a movie rating, a text regarding purchasing movie tickets for the Action Movie), etc., where any one or more of which may be clicked on and/or otherwise activated to launch the movie ticket app (e.g., in the first contextually aware state). In an example, the second search result 622b may comprise an icon for the movie review app, a mini-screenshot of the Action Movie review and/or a text description (e.g., summary of the Action Movie review), etc., where any one or more of which may be clicked on and/or otherwise activated to launch the movie review app (e.g., in the second contextually aware state). In this way, the first search result 622a, the second search result 622b, and/or other search results, embedded with links and/or execution contexts, may be displayed 622. Responsive to receiving a selection of a search result, a corresponding application may be launched into a contextually aware state using an execution context.

According to an aspect of the instant disclosure, a method for query suggestion formation for multi-source queries is provided. The method includes identifying a partial search query inputted into a multi-source search interface by a user. User signals associated with the user may be evaluated to identify a search intent of the user. An implied content source may be identified from a set of available content sources based upon the search intent. A query suggestion may be formulated based upon the implied content source and the partial search query. The search query suggestion may be provided through the multi-source search interface.

According to an aspect of the instant disclosure, a method for ranking multi-source search results is provided. The method includes receiving a search query inputted into a multi-source search interface by a user. A first content source, providing a first type of content associated with the search query, may be identified. A second content source, providing a second type of content associated with the search query, may be identified. User signals, associated with the user, may be evaluated to identify a content type preference of the user. A first relevancy rank may be assigned to the first content source based upon the content type preference. A second relevancy rank may be assigned to the second content source based upon the content type preference. Responsive to the first relevancy rank exceeding a relevancy threshold, first content, corresponding to the search query, may be provided from the first content source through the multi-source search interface as a first search result. Responsive to the second relevancy rank exceeding the relevancy threshold, second content, corresponding to the search query, may be provided from the second content source through the multi-source search interface as a second search result.

According to an aspect of the instant disclosure, a system for exposing contextual launch functionality through multi-source search results of a multi-source search interface is provided. The system includes a multi-source search interface component. The multi-source search interface component may be configured to receive a search query inputted into a multi-source search interface by a user. The multi-source search interface component may be configured to identify a first content source that provides a first type of content associated with the search query. The multi-source search interface component may be configured to identify a first application that is associated with the first type of content. The multi-source search interface component may be configured to identify a second content source that provides a second type of content associated with the search query. The multi-source search interface component may be configured to identify a second application that is associated with the second type of content. The multi-source search interface component may be configured to embed a first link, to the first application, within a first search result corresponding to the search query. The multi-source search interface component may be configured to embed a second link, to the second application, within a second search result corresponding to the search query. The multi-source search interface component may be configured to provide the first search result and the second search result through the multi-source search interface.

According to an aspect of the instant disclosure, a means for query suggestion formation for multi-source queries is provided. A partial search query, inputted into a multi-source search interface by a user, may be identified by the means for query suggestion formation. User signals associated with the user may be evaluated, by the means for query suggestion formation, to identify a search intent of the user. An implied content source may be identified, by the means for query suggestion formation, from a set of available content sources based upon the search intent. A query suggestion may be formulated, by the means for query suggestion formation, based upon the implied content source and the partial search query. The search query suggestion may be provided, by the means for query suggestion formation, through the multi-source search interface.

According to an aspect of the instant disclosure, a means for ranking multi-source search results is provided. A search query, inputted into a multi-source search interface by a user, may be received by the means for ranking multi-source search results. A first content source, providing a first type of content associated with the search query, may be identified by the means for ranking multi-source search results. A second content source, providing a second type of content associated with the search query, may be identified by the means for ranking multi-source search results. User signals, associated with the user, may be evaluated, by the means for ranking multi-source search results, to identify a content type preference of the user. A first relevancy rank may be assigned to the first content source, by the means for ranking multi-source search results, based upon the content type preference. A second relevancy rank may be assigned to the second content source, by the means for ranking multi-source search results, based upon the content type preference. Responsive to the first relevancy rank exceeding a relevancy threshold, first content, corresponding to the search query, may be provided from the first content source through the multi-source search interface as a first search result by the means for ranking multi-source search results. Responsive to the second relevancy rank exceeding the relevancy threshold, second content, corresponding to the search query, may be provided from the second content source through the multi-source search interface as a second search result by the means for ranking multi-source search results.

According to an aspect of the instant disclosure, a means for exposing contextual launch functionality through multi-source search results of a multi-source search interface is provided. A search query, input into a multi-source search interface by a user, may be received by the means for exposing contextual launch functionality. A first content source, providing a first type of content associated with the search query, may be identified by the means for exposing contextual launch functionality. A first application, associated with the first type of content, may be identified by the means for exposing contextual launch functionality. A second content source, providing a second type of content associated with the search query, may be identified by the means for exposing contextual launch functionality. A second application, associated with the second type of content, may be identified by the means for exposing contextual launch functionality. A first link, to the first application, may be embedded within a first search result corresponding to the search query by the means for exposing contextual launch functionality. A second link, to the second application, may be embedded within a second search result corresponding to the search query by the means for exposing contextual launch functionality. The first search result and the second search result may be provided through the multi-source search interface by the means for exposing contextual launch functionality.

Figure 7:
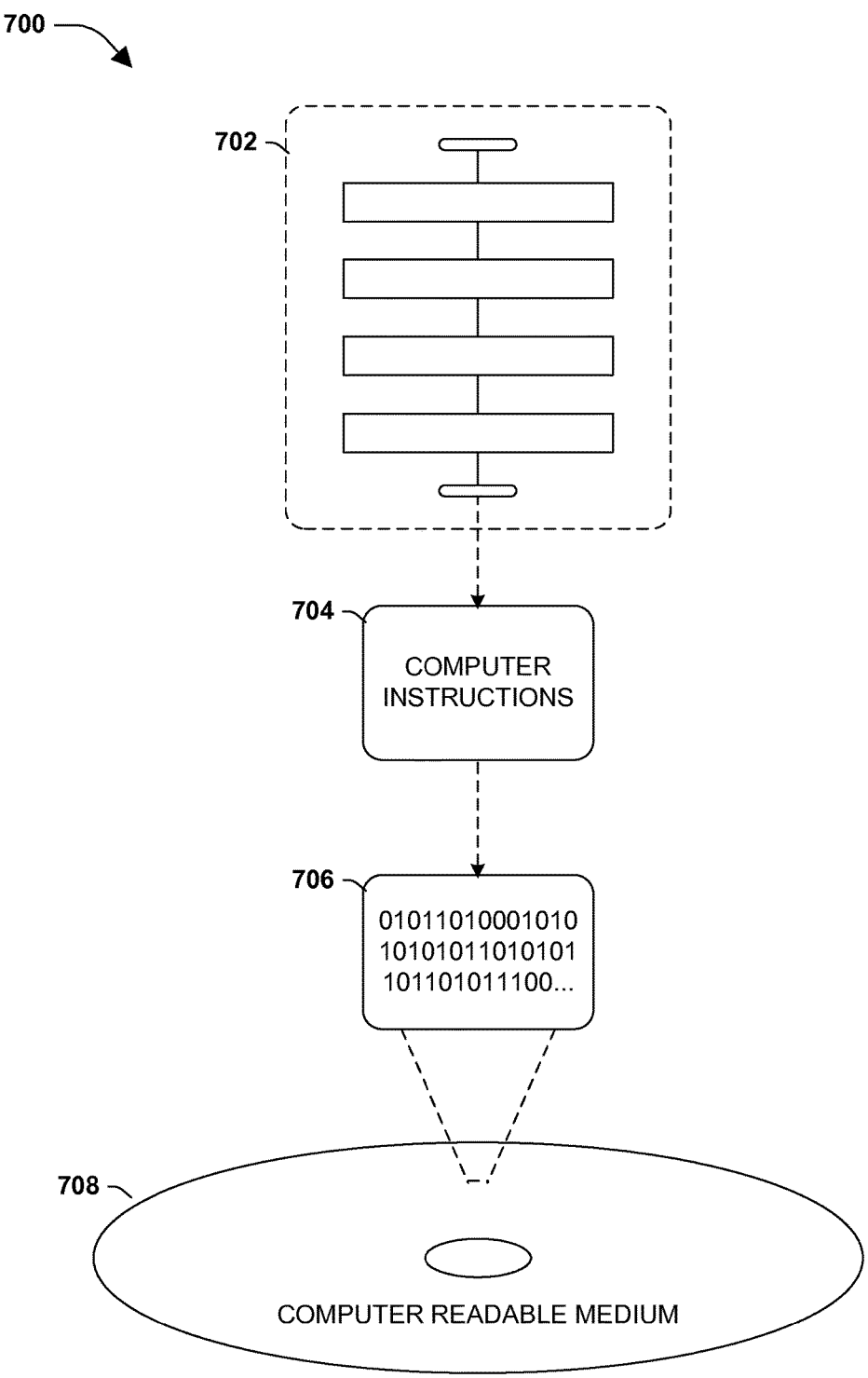
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1 and/or at least some of the exemplary method 400 of FIG. 4, for example. In some embodiments, the processor-executable instructions 704 are configured to implement a system, such as at least some of the exemplary system 200 of FIG. 2, at least some of the exemplary system 300 of FIG. 3, at least some of the exemplary system 500 of FIG. 5, and/or at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
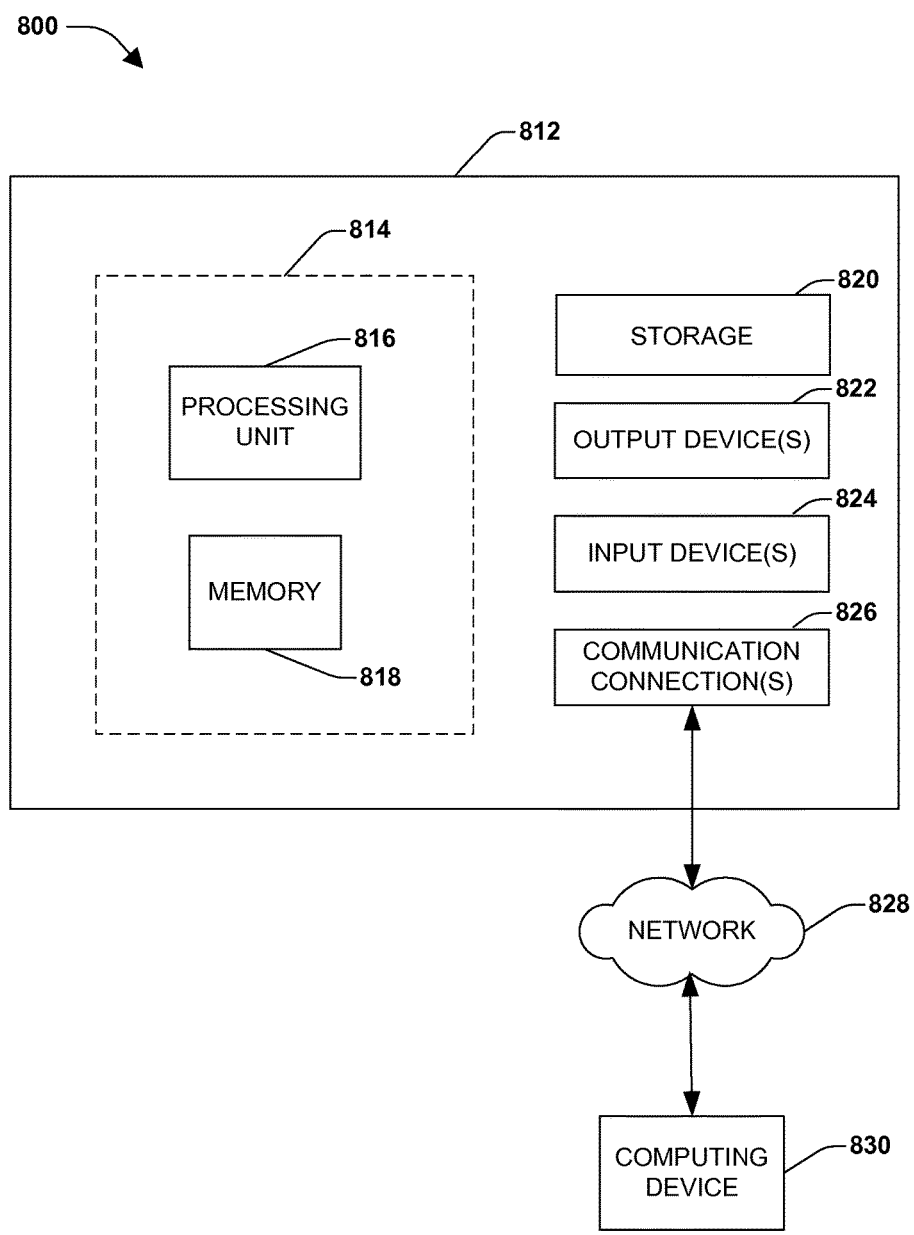
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Computer storage media does not, however, include propagated signals. Rather, computer storage media excludes propagated signals. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for query suggestion formulation for multi-source queries, comprising:
    identifying a partial search query input into a multi-source search interface by a user;
    evaluating user signals associated with the user to identify a search intent of the user;
    identifying a first content source providing a first type of content associated with the partial search query;
    identifying a second content source providing a second type of content associated with the partial search query;
    assigning a first relevancy rank to the first content source based upon the search intent of the user;
    assigning a second relevancy rank to the second content source based upon the search intent of the user;
    responsive to the first relevancy rank exceeding a relevancy threshold, formulating a first query suggestion based upon the first content source and the partial search query;
    determining that the second relevancy rank does not exceed the relevancy threshold for formulating a second query suggestion based upon the second content source and the partial search query; and
    providing the first query suggestion and not providing the second query suggestion through the multi-source search interface.

2. The method of claim 1, the identifying the first content source comprising:
    responsive to determining that the partial search query corresponds to a second user, identifying a messaging server content source as the first content source based upon prior message communications between the user and the second user.

3. The method of claim 1, the identifying the first content source comprising:
    responsive to determining that the partial search query corresponds to a second user, identifying a social network content source as the first content source based upon prior social network interactions between the user and the second user.

4. The method of claim 1, the identifying the first content source comprising:
    responsive to determining that the partial search query corresponds to a second user, identifying a file system content source as the first content source based upon the second user being at least one of an author or a provider of a file.

5. The method of claim 1, the set of available content sources comprising at least one of a video streaming content source, a messaging content source, a file system content source, a social network content source, a website content source, a document content source, an image content source, or a data content source.

6. The method of claim 1, the user signals comprising at least one of a file, social network interaction, message communication, web browsing history, an image, a geolocation, a time, an executing application, an installed application, an app store application, calendar data, email data, social network data, a device form factor, a user search log, or content consumed by the user.

7. The method of claim 1, wherein the assigning a first relevancy rank and the assigning a second relevancy rank is implemented client-side.

8. The method of claim 1, the query suggestion comprising at least one of a suggested query completion, a website, a user contact, or a file.

9. The method of claim 1, the formulating the first query suggestion comprising: including content, having the first content type, within the first query suggestion.

10. A computer readable hardware-medium comprising instructions which when executed by a computing device cause the computing device to perform a method for ranking multi-source search results, comprising:
    receiving a search query input into a multi-source search interface by a user;
    identifying a first content source providing a first type of content associated with the search query;
    identifying a second content source providing a second type of content associated with the search query;
    evaluating user signals associated with the user to identify a content type preference of the user;
    assigning a first relevancy rank to the first content source based upon the content type preference;
    assigning a second relevancy rank to the second content source based upon the content type preference;
    responsive to the first relevancy rank exceeding a relevancy threshold, providing first content, corresponding to the search query, from the first content source through the multi-source search interface as a first search result; and
    responsive to the second relevancy rank exceeding the relevancy threshold, providing second content, corresponding to the search query, from the second content source through the multi-source search interface as a second search result.

11. The computer readable medium of claim 10, the assigning a first relevancy rank and the assigning a second relevancy rank implemented client-side.

12. The computer readable medium of claim 10, the assigning a first relevancy rank and the assigning a second relevancy rank implemented server-side.

13. The computer readable medium of claim 10, the method comprising:
    responsive to the second relevancy rank not exceeding the relevancy threshold, not providing the second content.

14. The computer readable medium of claim 10, the method comprising:
    responsive to the first relevancy rank being greater than the second relevancy rank, ordering the first search result before the second search result.

15. The computer readable medium of claim 10, the user signals comprising at least one of a file, social network interaction, message communication, web browsing history, an image, a geolocation, a time, an executing application, an installed application, an app store application, calendar data, email data, social network data, a device form factor, a user search log, or content consumed by the user.

16. The computer readable medium of claim 10, at least one of:
the providing first content comprising embedding a first link to a first application associated with the first content within the first search result, or the providing second content comprising embedding a second link to a second application associated with the second content within the second search result.

17. The computer readable medium of claim 16, at least one of:
the providing first content comprising embedding a first execution context into the first link for launching the first application into a first contextually aware state, or the providing second content comprising embedding a second execution context into the second link for launching the second application into a second contextually aware state.

18. A system for exposing contextual launch functionality through multi-source search results of a multi-source search interface, comprising:
a multi-source search interface component configured to:
receive a search query input into a multi-source search interface by a user;
evaluating user signals associated with the user to identify a content type preference of the user;
identify a first content source providing a first type of content associated with the search query;
identify a first application associated with the first type of content;
identify a second content source providing a second type of content associated with the search query;
identify a second application associated with the second type of content;
assigning a first relevancy rank to the first content source based upon the content type preference;
assigning a second relevancy rank to the second content source based upon the content type preference;
embed a first link, to the first application, within a first search result corresponding to the search query;
embed a second link, to the second application, within a second search result corresponding to the search query; and
responsive to the first relevancy rank exceeding a relevancy threshold and the second relevancy rank exceeding the relevancy threshold, provide the first search result and the second search result through the multi-source search interface.

19. The system of claim 18, the multi-source search interface component configured to:
embed a first execution context into the first link for launching the first application into a first contextually aware state; and
embed a second execution context into the second link for launching the second application into a second contextually aware state.

20. The system of claim 19, the multi-source search interface component configured to:
responsive to receiving a selection of the first search result, launch the first application into the first contextually aware state.

* * * * *